Oct. 1, 1968     D. F. STANFILL III, ET AL     3,404,283

DIFFERENTIAL SPECTRAL COMPARATOR

Filed Jan. 10, 1966

INVENTORS
DANIEL F. STANFILL III
JOHN D. REHNBERG

BY

ATTORNEY

United States Patent Office 3,404,283
Patented Oct. 1, 1968

3,404,283
DIFFERENTIAL SPECTRAL COMPARATOR
Daniel F. Stanfill III, Stamford, and John D. Rehnberg, Norwalk, Conn., assignors to Barnes Engineering Company, Stamford, Conn., a corporation of Delaware
Filed Jan. 10, 1966, Ser. No. 519,513
2 Claims. (Cl. 250—226)

ABSTRACT OF THE DISCLOSURE

A radiometer is provided which selectively compares two different spectral bands from the same field of view of a single detector. A chopper with a reflective surface on one side is flanked by selective reflecting means, each of which passes radiation in a different spectral band. These elements are positioned such that the detector alternately looks at the selected spectral bands, and the field of view of the detector in any position of the chopper remains the same regardless of the spectral band being viewed.

This invention relates to a radiometric device, and more particularly to a differential spectral comparator for selectively comparing two different spectral bands from the same field of view on a single radiation detector.

In the field of radiation measurement, it is often advantageous to obtain information with respect to the amount of radiation from a given field of view in distinct or separate spectral bands. In many applications it is also desirable to know the ratio or differential between two spectral bands from a given field of view for aiding in determining the compositons of materials, for material identification and analysis, such as gas analysis, flame studies, as well as others. One approach to this problem would be applying selected spectral bands simultaneously to a detector which would result in an output which would be indicative only of a summation of the radiation being applied to the detector. By this method one band could not be compared with the other. Another approach would be the use of two detectors in which one spectral band was applied to one and another spectral band applied to the other. The outputs from the two detectors could then be compared for providing the necessary ratioing or differential signal. One of the difficulties with this approach resides in the difficulty of obtaining two perfectly matched radiation detectors, as well as the necessity of having a plurality of detectors.

Accordingly, it is an object of this invention to provide a differential spectral comparator which produces a true differential signal from two different spectral bands from a single field of view on a single radiation detector.

A further object of this invention is to provide a true differential comparison signal between two different spectral bands from the same field of view with a smooth transition from one band to the other and equal time sharing for each band.

In carrying out this invention in one illustrative embodiment thereof, an optical system is provided for focusing radiation from a field of view onto a single radiation detector. Included in the optical system is a radiation chopper with a reflective surface on one side thereof for alternately passing and reflecting radiation from the field of view. Selective reflecting means are provided on each side of the chopper, each of which passes radiation in a different spectral band. The chopper and selective reflecting means are positioned such that the detector sees one spectral band and then the other alternately with a smooth transition between one and the other such that the field of view as seen by the detector in any position of the chopper cycle remains the same regardless of the spectral band being viewed.

Figure 1:
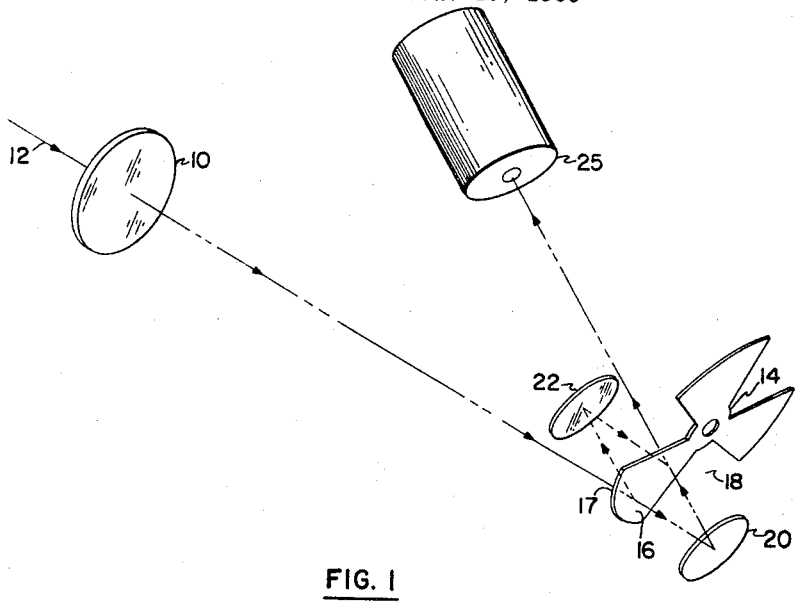
Figure 2:
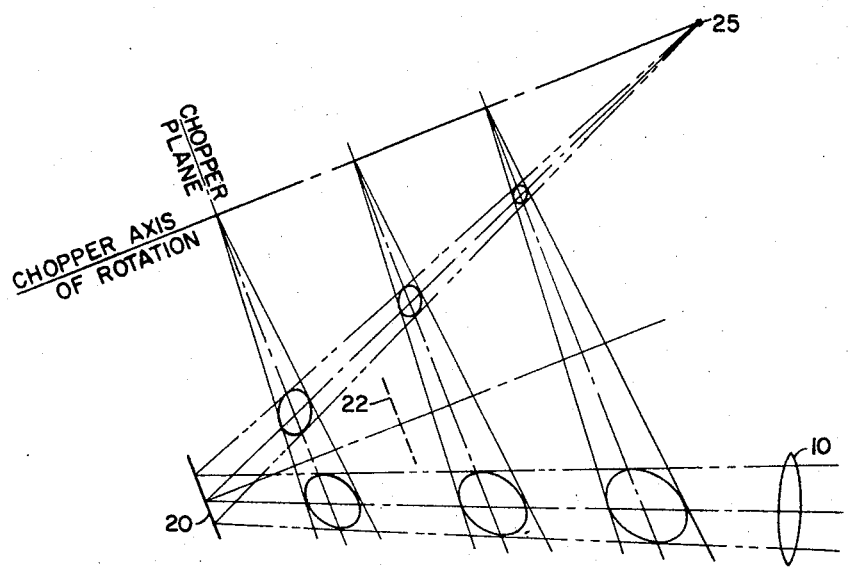

The invention, as well as further objects and advantages thereof, may best be understood by reference to the following description taken in connection with the accompanying drawings, in which:

FIG. 1 is an optical schematic diagram of the differential spectral comparator embodied in this invention, and FIG. 2 is an explanatory diagram illustrative of the design concepts used for the differential spectral comparator as shown in FIG. 1.

Referring now to FIG. 1, radiation 12 from a field of view is focused by an objective 10 on a radiation detector 25. For convenience of explanation, a single ray trace of radiation 12 is shown. The objective 10 is illustrated as a lens, but the system is not considered limited to dioptric systems, but may also utilize catoptrics for focusing the radiation on the detector. Likewise, the invention is not restricted to a particular type of optical instrument, as the objective 10 could be part of an infrared telescope, or more conventional radiometric optics may be utilized, depending on the particular application of the invention. Interposed in the path of the radiation between the objective 10 and the detector 25 is a radiation chopper 14 having alternate opaque sections 16 and transparent sections 18. One side of the chopper, which faces the objective 10, is a mirrored surface 17 such that radiation is alternately passed through transparent sections 18 of the chopper and reflected from the mirrored surface 17 of the opaque sections 16. Positioned on the mirrored side of the chopper 14 is a first spectral selective reflecting means 22, and positioned on the opposite side of the chopper is a second spectral selective reflecting means 20. The spectrally selective reflecting elements 20 and 22 may be reflective filters, Reststrahlen filters, or a transmission filter in combination with a plane reflective element. The major function of the spectral selective reflecting element is to choose a desired spectral band which is to be passed on to the detector 25.

In operation, radiation 12 from a field of view is applied via the objective 10 to the chopper blade 14 which alternately reflects incoming radiation 12 from its mirrored surface 17 to element 22 and passes incoming energy 12 to element 20. Elements 20 and 22 spectrally select radiation of a given spectral band and reflect it back toward the chopper 14. When the opaque sections 16 of chopper 14 obscure the detector's field of view, radiation from element 22 is reflected off of the mirror surface of the chopper 14 onto the detector 25. When the field of view of the detector 25 is unobstructed by the chopper 14, spectrally selected radiation from element 20 is applied through the transparent sections 13 of the chopper 14 to the detector 25. The described ray paths are shown in the drawing. Accordingly, the detector 25 receives radiation from the same field of view in two different spectral regions, thus producing a signal from the detector which is the differential, or ratio, of two spectral bands in the same field of view from a single detector. Since the elements 20 and 22 have different selective reflectivities, one can arbitrarily be chosen as the reference source if desired.

It will be noted in the schematic of FIG. 1 that the chopper intersects the radiation beam from the objective at two different points in its line of travel to the detector, whether radiation is received via element 20 or via element 22. In order to get a true differential comparison, the chopper blade 14 must cut the radiation beam at the same point in time on both passes. FIG. 2 is illustrated to explain this point. Radiation focused from the objective 10 to the detector 25 is converging in the form of a cone. Only its reflection from element 20 is shown, for purposes of illustration, and it will be seen that the radiation from objective 10 is reflected by element 20 onto the detector 25. It will be seen that chopper 25 must cut the beam of radiation in two locations which are different in beam size, and that chopper 25 cuts the incoming radiation cone at an angle, thus intersecting elliptical beam shapes. It will be seen from FIG. 2 that no matter where the chopper blade is positioned in the path of the radiation, that two elliptical areas of intersection are formed by the cutting of a chopping blade. It will also be seen that common tangents to any two ellipses all have a point of intersection on a line which is shown as the chopper axis of rotation. Accordingly, the chopper rotates about this axis, having chopper blades constructed with radial line edges which pass tangent through the edges of the beam of radiation chopped. With this arrangement, the chopper will, at both areas of intersection, cut through the same bundle of radiation at the same time, thus producing a true differential signal without degradation. With the plane of the chopper as indicated on FIG. 2, element 22 is shown positioned. The movement of the chopper blade along the chopper axis will require the movement of element 22.

The detector 25 may be any form of radiation detector which is sensitive to the spectral bands being compared. The output from the detector will be applied to a preamplifier and other suitable circuitry for processing the resulting signal. In the particular configuration shown in FIG. 1, although not limited thereto, a cooled detector 25 is advantageously employed, which is housed in a Dewar. Since the Dewar is pointing downward, the coolant therein would always be in contact with the detector to maintain the detector at a desired temperature.

What we claim is:

1. A differential spectral comparator for comparing two different spectral bands from the same field of view on a single detector comprising in combination
   (a) a radiation detector,
   (b) an optical objective for focusing radiation from a field of view on said detector,
   (c) a radiation chopper having a reflective surface on one side, said chopper being interposed in the radiation path between said objective and said detector for alternately passing and reflecting radiation from said field of view,
   (d) first spectral selective reflecting means for selecting and reflecting a first predetermined spectral band which is positioned on one side of said chopper such that when said chopper passes radiation, the spectral band reflected by said first means is applied to said detector,
   (e) second spectral selective reflecting means for selecting and reflecting a second predetermined spectral band which is positioned on the reflective surface side of said chopper such that when said chopper reflects radiation, said second spectral band selected by said second means is applied to said detector.

2. The structure set forth in claim 1 wherein said radiation chopper has blades with radial line edges and whose center of rotation is located by the intersection of common tangents to the edges of the radiation beam being chopped.

References Cited

UNITED STATES PATENTS

| | | | |
|---|---|---|---|
| 2,808,755 | 10/1957 | Millen | 250—226 |
| 2,941,444 | 6/1960 | Frykman | 250—233 |
| 3,193,199 | 7/1965 | Fuhs | 250—233 |

JAMES W. LAWRENCE, *Primary Examiner.*

W. J. SCHWARTZ, *Assistant Examiner.*